UNITED STATES PATENT OFFICE.

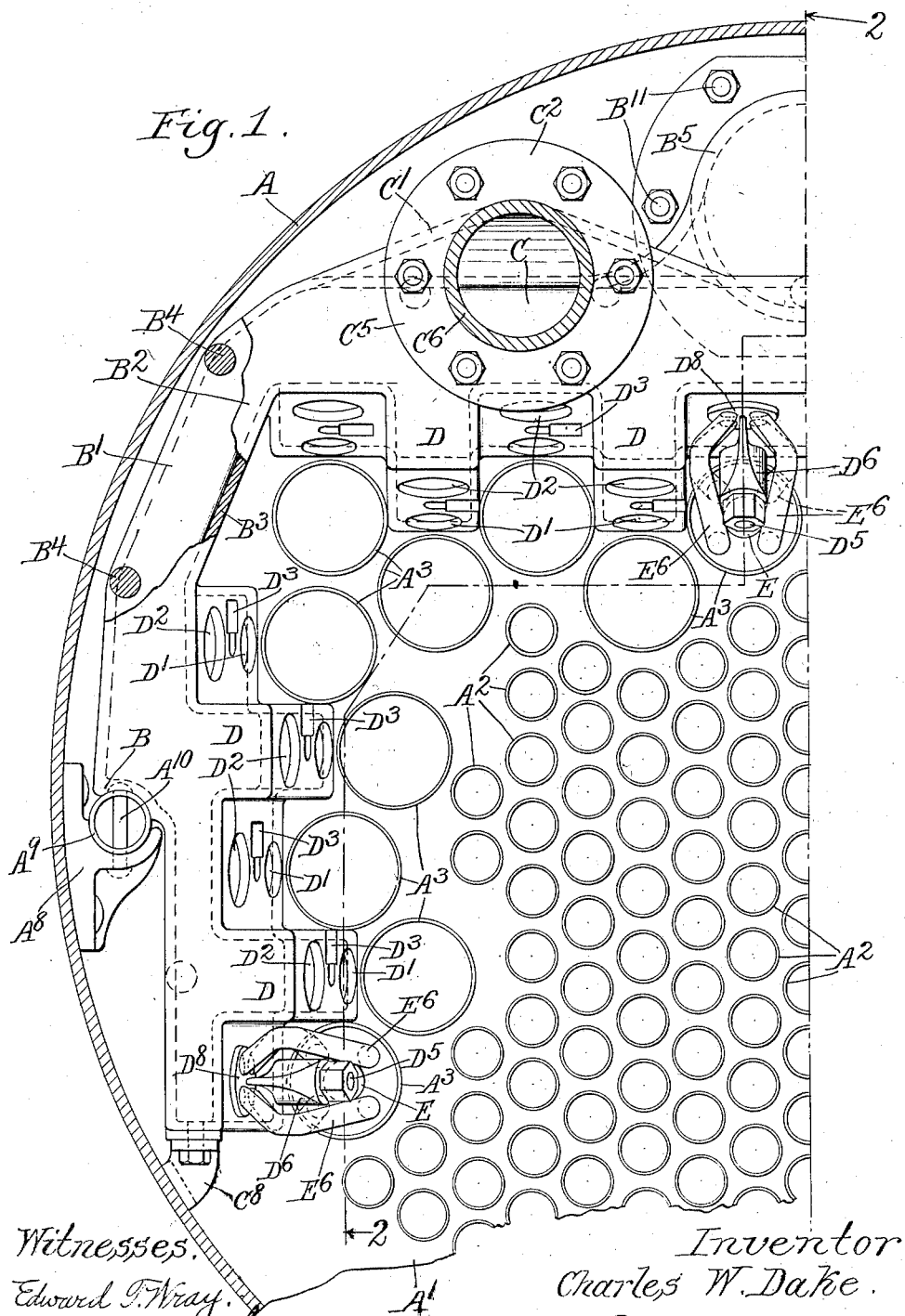

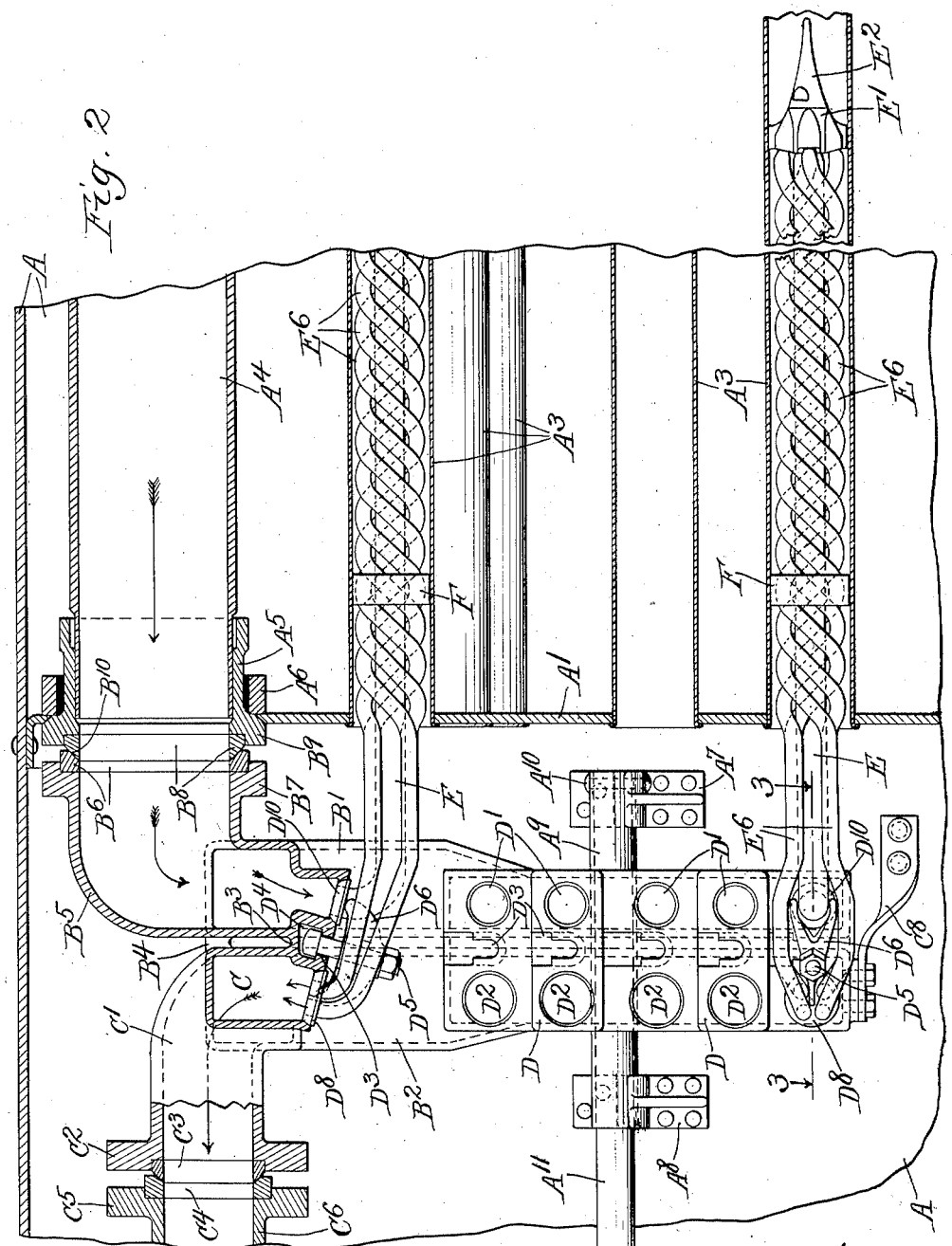

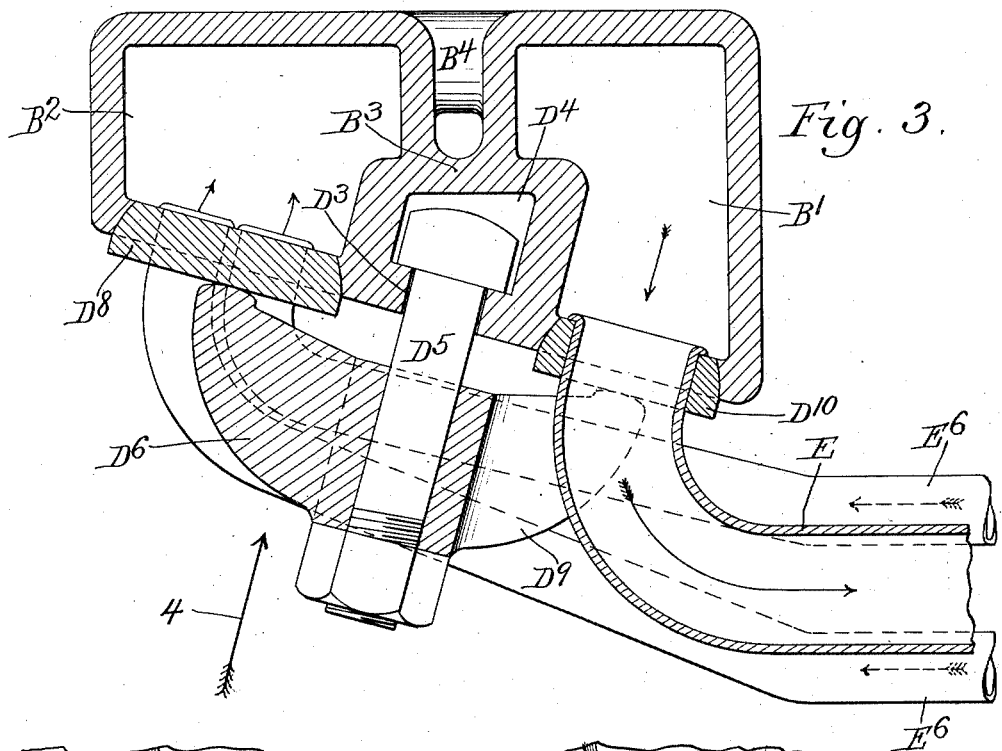
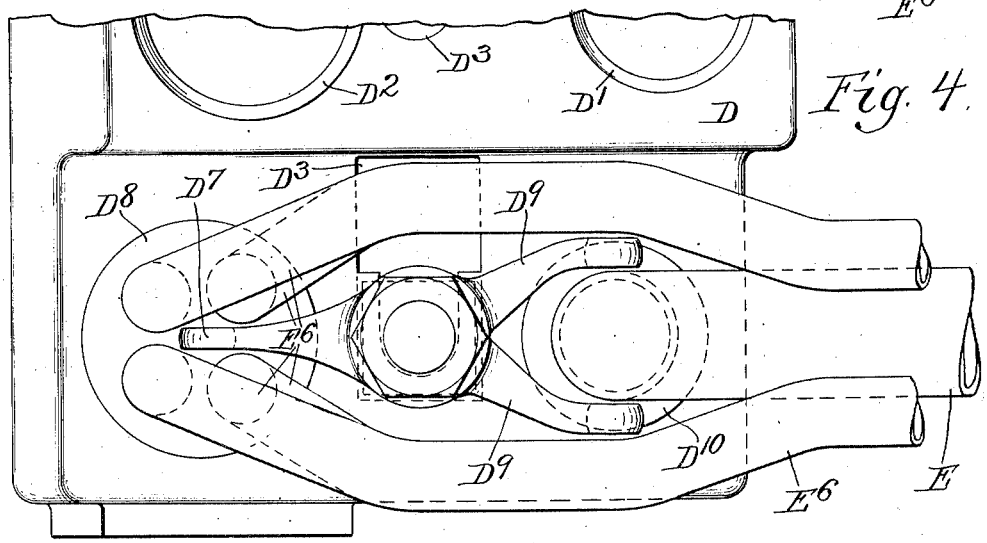

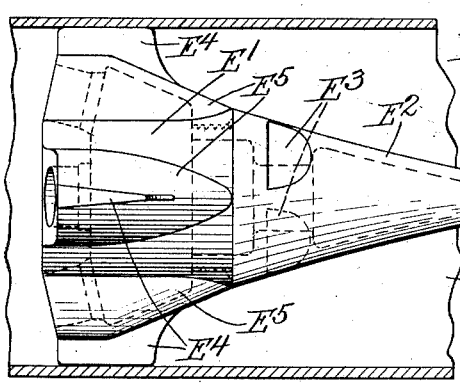
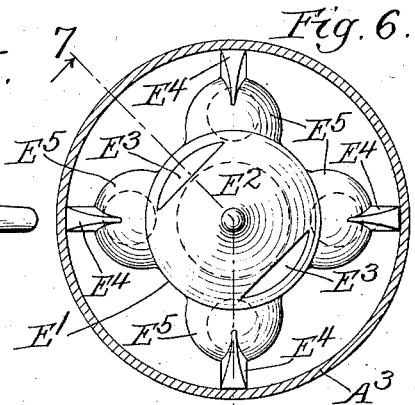
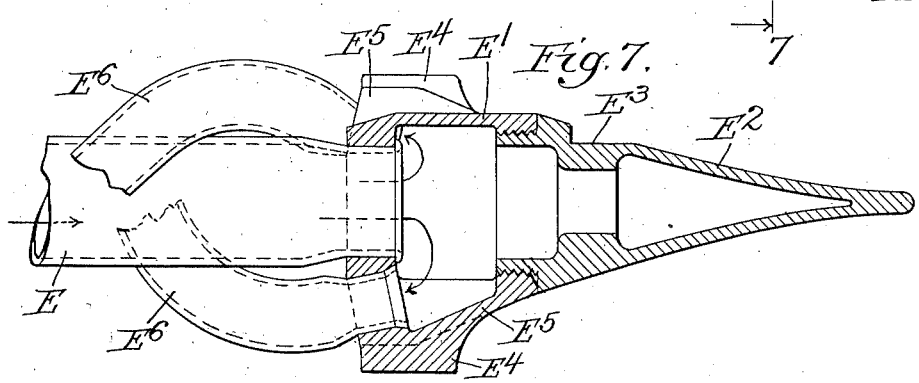
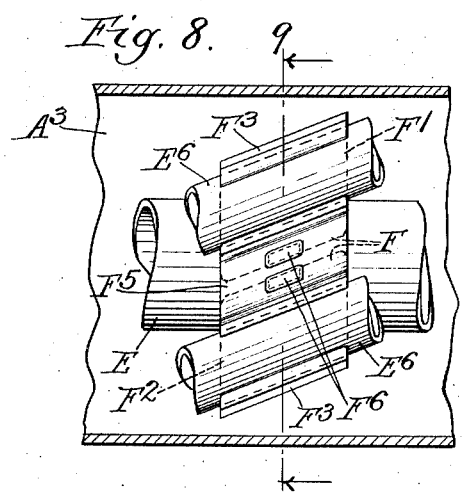
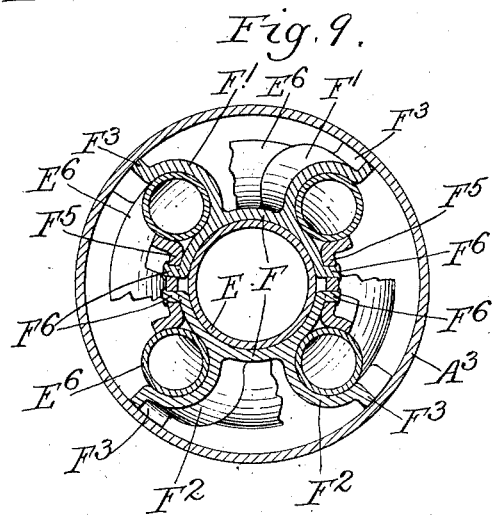

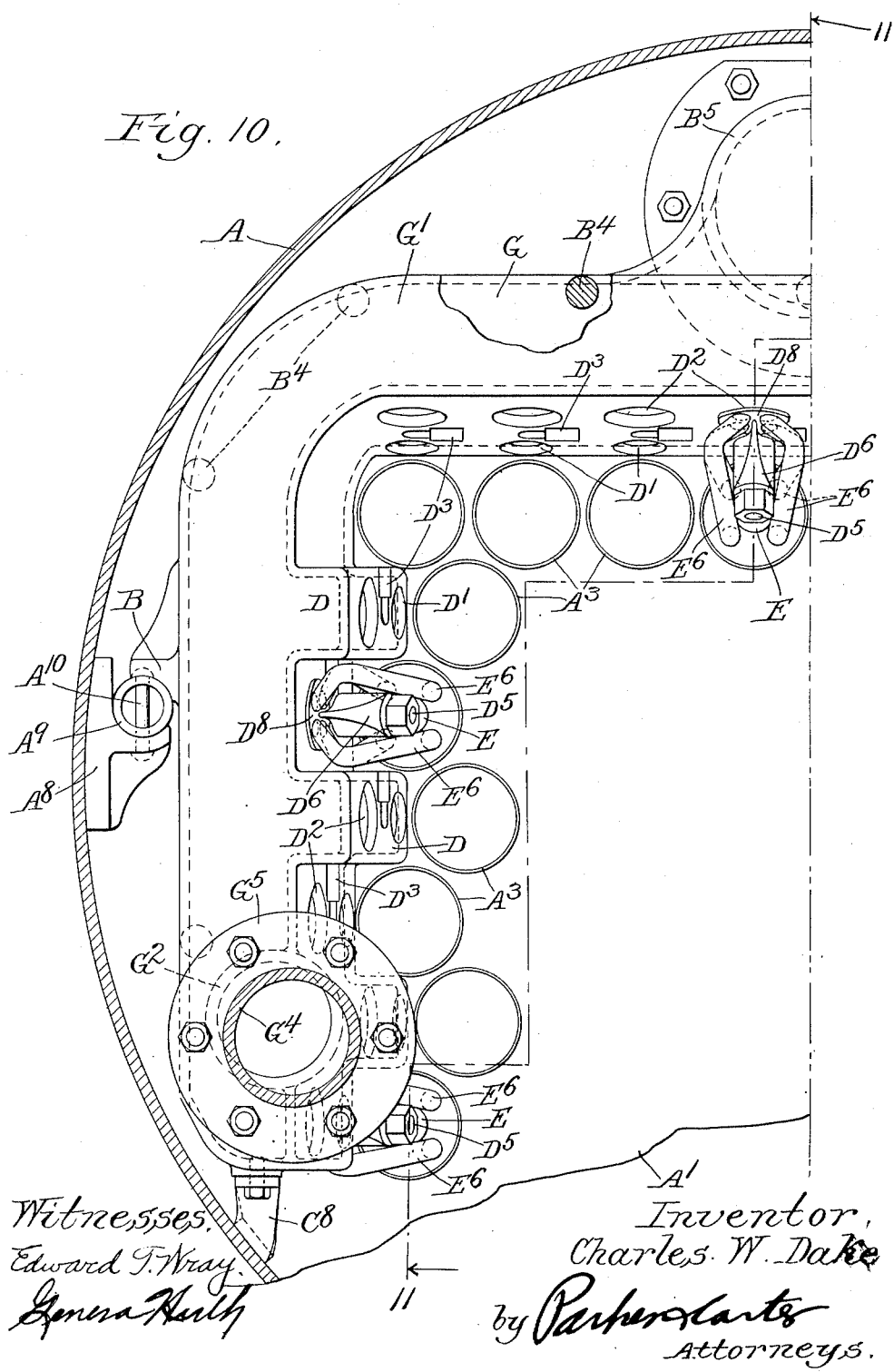

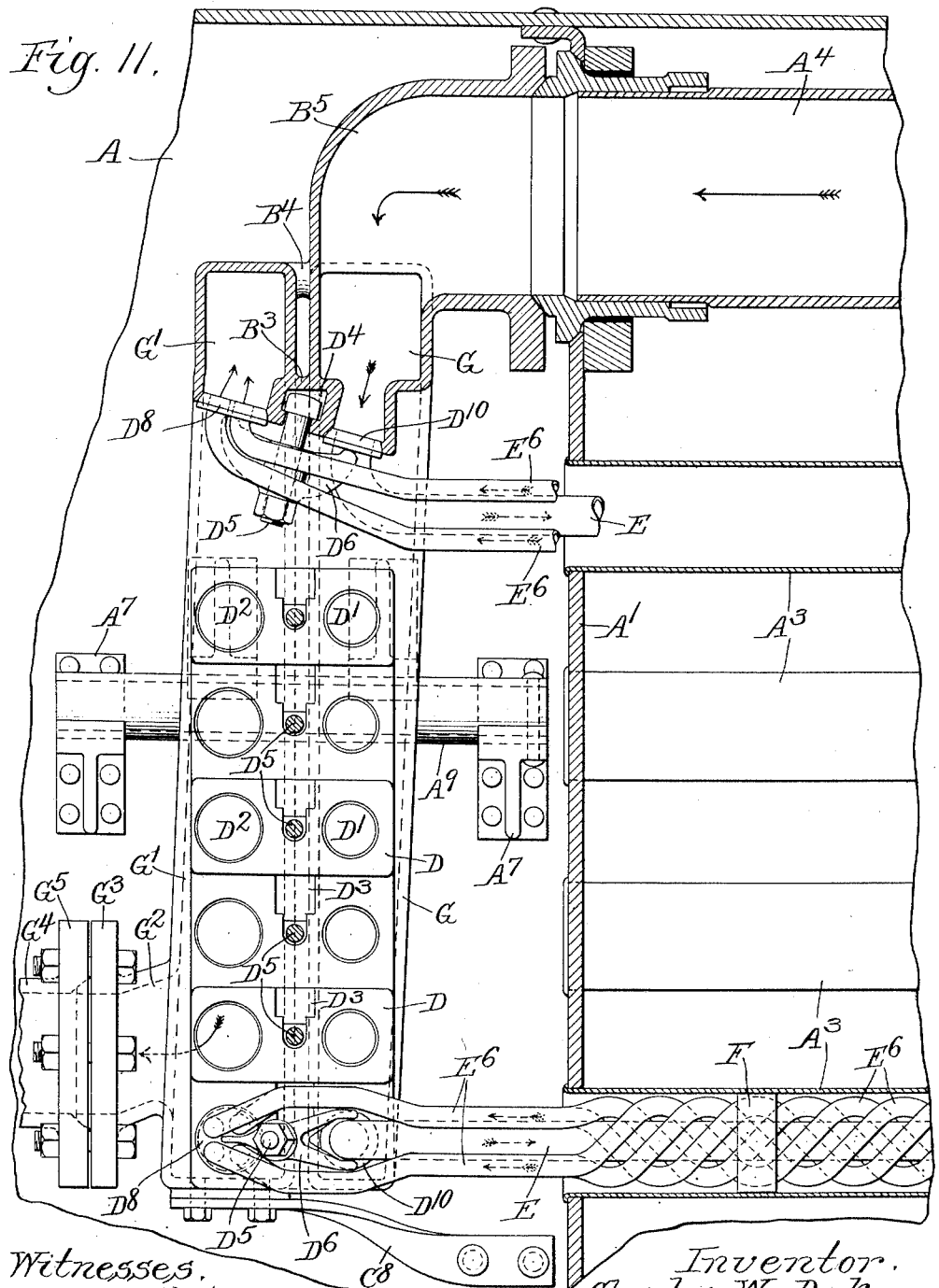

CHARLES W. DAKE, OF CHICAGO, ILLINOIS.

SUPERHEATER.

1,360,096.  Specification of Letters Patent.  Patented Nov. 23, 1920.

Application filed May 1, 1916. Serial No. 94,564.

*To all whom it may concern:*

Be it known that I, CHARLES W. DAKE, a citizen of the United States, residing at Chicago, in the county of Cook and State of Illinois, have invented a certain new and useful Improvement in Superheaters, of which the following is a specification.

My invention relates to improvements in superheaters and has for one object to provide a superheater for use in connection with locomotive boilers and the like, wherein a minimum of special flues are used, wherein a maximum superheating area is available, wherein the superheater units may be easily and conveniently separately removed, and wherein the whole superheater arrangement may be removed for inspection without interfering with the set up of the individual parts. Other objects of my invention will appear from time to time in the specification. The invention is illustrated more or less diagrammatically in the accompanying drawings, wherein, Figure 1 is a detailed section through the smoke box of a locomotive showing one side only with parts in elevation and parts in section and parts omitted;

Fig. 2 is a section along the broken line 2—2 of Fig. 1;

Fig. 3 is a section along the line 3—3 of Fig. 2 on an enlarged scale;

Fig. 4 is a detail looking in the direction of the arrow 4 on Fig. 3.

Fig. 5 is a side elevation of the cap on the fire box end of one of the superheater sections;

Fig. 6 is a section through the flue showing this cap in elevation;

Fig. 7 is a section along the line 7—7 of Fig. 6;

Fig. 8 is a section through a flue showing a part of the superheater section in elevation, illustrating the spacing arrangement;

Fig. 9 is a section along the line 9—9 of Fig. 8;

Fig. 10 is a view similar to Fig. 1 showing a modified form;

Fig. 11 is a section along the line 11—11 of Fig. 10.

Like parts are indicated by like characters in all the drawings.

A is the wall of the smoke box. $A^1$ is the front end or head of the boiler. This wall A also forms the back wall of the smoke box. $A^2$ $A^2$ are a series of the usual type of locomotive fire tubes or flues beaded or otherwise attached to the wall of the boiler and communicating with the fire box not here shown. $A^3$ $A^3$ are a series of large size or superheater fire tubes or flues. These fire tubes are within the boiler and beaded or otherwise attached to the front wall of the boiler, in the usual manner, but they are much larger than the ordinary sized flue, and are intended to contain the superheater elements which in accordance with the usual practice are so large as not to go into the ordinary sized flue. In my preferred form I provide twenty of these large flues, because I find that by my arrangement twenty superheater sections are enough to give me the desired heating area.

$A^4$ is a dry steam pipe which terminates in a sleeve $A^5$ provided with a packing nut $A^6$ to hold it firmly and rigidly in position in the boiler head $A^1$. $A^7$ $A^8$ are superheater supporting brackets mounted on the side walls of the smoke box A and joined by hollow tubes $A^9$, held in position by the pin $A^{10}$ and open at their forward ends to contain a removable bar $A^{11}$ which bar is provided and expected to be used only in connection with the shop work necessary for disassembling the boiler and superheater. The bars under such circumstances furnish a continuation of the supporting tubes or pipes and permit the whole superheater to be moved forward away from the front of the boiler and supported on such pipes in line with it removed from the boiler.

I provide as shown in one unit or casting a combined saturated and superheated steam header which is arranged in substantially horse-shoe shape and is provided on opposed sides with shoulders or lugs B so positioned and disposed as to rest when the superheater is in operative position in the boiler one on each of the tubes $A^9$. I have indicated the saturated steam part of the header as $B^1$ and the superheated steam part as $B^2$. These two parts are tied together by the web $B^3$ and spaced by occasional bosses $B^4$ so that while they form a unit, the amount of metal interposed between them is comparatively small, thus resulting in a minimum of heat conduction from one to the other. $B^5$ is an elbow projecting from the top center of the saturated steam header rearwardly in line with the dry pipe. $B^6$ is a cylindrical packing ring in the face of the flange $B^7$ on the elbow, and $B^8$ is a packing ring in the face of the flange $B^9$ on the sleeve $A^5$. There is a spherical joint as at $B^{10}$ between the two sleeves. The flanges are held together by the bolts $B^{11}$ so as by the use of these two packing rings to make a tight joint between the dry pipe and the saturated steam header.

The superheated steam header $B^2$ which is located in front of the saturated steam header is provided with an enlarged chamber C extending clear across the top of the header and communicating on either side of the axial line of the boiler with an elbow $C^1$. Each one of these elbows $C^1$ is flanged as at $C^2$ and is provided with a packing ring $C^3$ in spherical engagement with a packing ring $C^4$ in a flange $C^5$ on the end of one of the steam supply pipes $C^6$, which pipes lead in the present preferred arrangement each to one of the engines, the packing being held tight by bolts and nuts as indicated to furnish a steam-tight passage from the header to each engine. These steam pipes while they are connected one to each side of the header nevertheless are so disposed and the size of the header chamber is such that as one engine draws steam from the header that steam will be provided and come to the pipe feeding the engine from all points of the header. Thus the steam in the space between the two steam pipes will be free to change its direction of travel so that each pipe in turn is fed from the whole header. $C^8$. $C^8$ are stay or supporting straps bolted to the lower ends of the header. These are anchored on the side walls of the smoke box A, A as indicated to steady the superheater so that the superheater while supported and carried by the brackets, is steadied by these straps and by the steam pipe connections in part so that the header is stayed against rocking movement both above and below and its weight is carried at a central point. The superheater flues in the boiler are arranged just inside the horseshoe formed by the header and there staggered as shown in order that they may occupy a minimum of space in the boiler head. The inner sides of the vertically disposed header arms and the bottom side of the central horizontally disposed header body are provided with a series of teeth or crenelations D. These crenelations together with the space between them have plane bounding surfaces inwardly and rearwardly inclined. These plane surfaces are apertured as indicated at $D^1$ communicating with the interior of the saturated steam header and at $D^2$ communicating with the interior of the superheated steam header. The wall which extends across the header to form the surfaces in which these apertures are disposed is slotted as at $D^3$. This slot is enlarged at one end and toward the center between the two apertures is reduced so that a pocket $D^4$ is formed between such wall and the web $B^3$ wherein the head of a bolt may be contained. This bolt $D^5$ extends out through the slot and projects through the central portion of a crab $D^6$. This crab or 3-point holding member has a tongue $D^7$ which engages a plug $D^8$ in the aperture $D^2$ and is forked as at $D^9$ to engage at two points a plug $D^{10}$ in the aperture $D^1$. Both these plugs seat in ball joints in their respective apertures.

E is a superheater steam pipe. It is beaded or riveted into the open central portion of the plug $D^{10}$ and is curved as indicated, the curvature being such that when the plug is in position in the header wall this pipe will extend centrally back into the adjacent superheater flue. The pipe E is reduced at its rear end and there beaded into a cap $E^1$. This cap $E^1$ is provided with a screw-threaded conical pointed cover $E^2$ which is in line with the axis of the pipe and projects beyond its end toward the fire box. This screw-threaded cap is squared as at $E^3$ so that it may be turned in position by a wrench. The cap $E^1$ is provided with the four spacing ribs $E^4$ adapted to rest against the inside walls of the flue to hold the cap cover and pipe all in a central position within the flue. These ribs, where they project out from the housing, are V-shaped so as to offer a minimum resistance to the passage of the gases through the flue and the contour of the ribs and the cap cover are such that there will be little if any tendency for solids from the flue gases to deposit thereupon. The cap $E^1$ is provided with four enlarged circular chambers $E^5$ in communication with the interior of the cap having their bottom walls apertured to contain the reduced ends of the superheater return pipes $E^6$ which are beaded into position. I have shown here four such return pipes. There might be more or less. These pipes $E^6$ are wound spirally about the central steam pipe and are out of contact with it and out of contact with the wall of the flue. They extend back toward the front of the boiler and where they leave the boiler each becomes again parallel with the central pipe. These four pipes are spread apart in groups of two, pass around the holding crab and extend down and pass through the plug $D^8$, being beaded into position therein so that a return circuit is provided for the passage of steam from the saturated header through the central pipe to the cap closing its inner end, thence back through the spiral pipes to discharge into the superheater steam header.

The spiral return pipes are held in fixed operative position with respect to and out of contact with both flue walls and the central superheating pipe by means of a special type of spacer, which interferes little if any with the passage of gas through the flue, This spacer is made up of two semi-cylindrical saddles F adapted to rest upon and partially surround the pipe E. Each of these saddles carries two outwardly extended spirally arranged semi-cylindrical brackets or flanges $F^1$, $F^2$ having extensions $F^3$ projecting out in a substantially radial direction to contact the flue walls. One of the spiral return pipes rests against each of these brackets and is clamped in position therein by a perforate wedge plate $F^5$, there being two such plates for each pair of saddles. The ends of the saddles are bent up as at $F^6$ to pass through the perforations in the wedge plates and these upwardly bent ends are riveted over to permanently fasten the parts together. The wedge plates are provided with opposed flanges, which flanges have curved surfaces to engage the pipes so that when the saddles are in place and the wedge plates are riveted down the five pipes are all held firmly and rigidly together in position.

In my preferred form I have shown header sections larger toward the center than toward the ends of the arms because only a part of the steam has to pass through the lower ends of the header arms, whereas it must all pass through the central portion owing to the fact that the saturated steam is fed to the header at the center and the superheated steam is drawn off from the header at two points near the center.

In my modified form, however, I have shown a saturated steam header G and a superheated steam header $G^1$ wherein the cross sectional area of the headers does not vary appreciably between the center and the ends of the arms. In this arrangement the discharge from the superheated steam header is not from a point adjacent the center but from two points adjacent the ends of the arms. In this case adjacent the end of each arm is provided a pipe $G^2$ flanged as at $G^3$ communicating with a steam supply pipe $G^4$, which pipe is flanged at $G^5$, the flanges being held together by the usual type of bolt and nut arrangement with packing gland between them. The superheater sections and their connection to the header are exactly the same as in my preferred form and the only difference is the arrangement of the take-off or steam supply which in this case occurs, instead of at a point adjacent the center of the header, at two points adjacent the ends of the arms.

It will be evident that while I have shown in my drawings an operative device, still many changes might be made both in size, shape and arrangement of parts without departing materially from the spirit of my invention, and I wish, therefore, that my drawings be regarded as in a sense diagrammatic.

The use and operation of my invention are as follows:

When a fire is made in the boiler steam is generated and this steam passes through the dry pipe into the saturated steam header. It passes thence through the superheater elements, being heated while passing through them by the flue gases impinging directly upon the walls of the pipe containing the steam. This steam returns as superheated steam to the superheated steam header, whence it is drawn off to supply the engines.

Each superheater element is exactly the same as each other superheater element and all the elements may be used interchangeably. The distance between the anchor point or connection point for any element and the flue in which that element is to lie is exactly the same as the corresponding distance from any other flue to its adjacent anchor or connection point. Each element is held in position in operative relation to the two superheater headers by a single uniform holding mechanism and any one element may be withdrawn without interfering with or in any way affecting any other element. Each element is supported in the flue in which it lies, and is not supported by but is only connected to the header so that when it is desired to withdraw the header the superheater elements attached to it as a unit, it is necessary only to break the steam connections, unbolt the holding strips at the lower ends of the header arms and slide the header as a unit out away from the boiler head, allowing it to travel along the supporting hollow tubes on either side of the smoke box. If heavy bars are thrust into the hollow tubes to project out beyond the smoke box, the superheater may be drawn out, sliding along such bars, the inner ends of the elements being supported by the boiler itself until the header is drawn out so far that the tubes no longer touch the boiler flues. The supporting contact between the header and the cross tubes which carry it is a friction contact such that the smoke box, the header and the tubes are all free to expand and contract independently, any change in position, size or shape being completely and easily compensated for by sliding of the superheater along the tubes upon which it is mounted and by rotation in the ball joints.

The steam joints between the headers and the boiler and the engines are packed by means of spherical packing rings so that there is here no inference to slight changes in position or size. The members are free to give and move in the usual manner.

The individual superheater element sections are made up preferably of a central supply pipe, which pipe is for the greater portion of its length parallel with the axis of the flue in which it lies. It is bent at its outer end to engage a plug, which plug has a spherical surface occupying a spherical seat in an aperture communicating with the saturated steam header. The other end of this pipe is closed by a cap, which cap is larger than the end of the pipe and overhangs the ends of a series of spiral return pipes. These spiral return pipes are wound about the central pipe and are very much longer than the central pipe and together have very much larger heating surface in proportion to their volume so that the steam which as it passes through the central pipe is superheated is still further superheated by its intimate contact with the heated gases which impinge upon the inclined walls of the spiral pipe and thus thoroughly heat each and every steam particle. The ends of these spiral pipes as well as the end of the central pipe are reduced so as to save room and permit the use, in my preferred form, of a large number of pipes in the flue side by side. The contour of the cover for the cap is such that the gases pass smoothly and freely over it and solids, particularly carbon, are not deposited.

I have talked about a header and in my preferred form, the header furnishes a connection for a large number of superheater elements, so it will be obvious that the header might connect a much smaller number of superheater elements, and in fact, any pipes or any conduits which serve as a connection or attachment to effect a steam communication with the boiler or with the engine and the superheater elements is a header.

The spacer or position member, which holds the superheating pipes in position in the flue is set back appreciably from the end of the flue so that there is a slight amount of spring in the pipe. This spring is just sufficient so that when the holding crab is loose, the pipes can be sprung down to remove the ball seated plugs from engagement with the apertures in the header and permit in view of the inclination of the surface in which the apertures are disposed, a free withdrawal of the element from the header.

Each superheater unit consists of pipes of different sizes, the cross section of one set being equal to the cross section of the other. As above pointed out, the preferred arrangement is where one set of pipes consists of a single central pipe and the other of a series of smaller pipes parallel therewith or arranged in part transversely to the direction of flow of the hot gases or spirally, but obviously such transverse arrangement can be secured by other than spiral means and one set of pipes could be arranged in one portion of the flue and the other in another portion. The preferred arrangement is that which comprises a heavy stiff relatively large central pipe and a series of small spiral pipes arranged thereabout. In the case here illustrated I have shown four such spiral pipes.

By arranging the pipes in the manner last suggested it is possible to mount at the free end of such superheater units a conical cap which will present a point and sharply inclined sides to the inflowing gases. This cap can be reduced in effective cross sectional area by providing pipe holes smaller than the pipes and reducing the cross sectional area of one or more of the pipes and preferably all of them. This can be done because such slight reduction of the cross sectional area of the pipe or pipes at one point will not interfere with the flow of steam therethrough. The cap may also have side vanes to center it in the flue and thus furnish a proper support for the outer end of the superheater unit. The spiral arrangement of the pipes, and particularly the use of a group of pipes of relatively small cross section about the central pipe will leave wide open spaces about the cap for the flow of the gases.

The inner end of the superheater unit is arranged in my preferred form so that the connection of one pipe section with the header is placed back of or in substantially the same longitudinal line with the connection of the other, and these two connecting openings are preferably placed on an inclined surface or are inclined with reference to each other. This greatly facilitates the removal of the unit and each unit is secured by one and one only securing device or crab so that the removal of any unit takes place without disturbing the connections of the others. Arranging the pipes or some of them transversely tends to utilize to the greatest possible degree the heating action of the passing gases, and any arrangement whereby the flow of the gases is thus interrupted or any arrangement whereby a departure is made from the parallelism of the pipes with one another and the flue falls within the scope of my invention.

These several flues are held in this position by a supporting and spacing device which closely hugs the several tubes or pipes so as not to interfere with the flow of the hot gases therealong.

By having some of the pipes, that is the pipes of one group in the superheater unit, arranged transversely or spirally, it is possible to connect the ends of the two groups together rigidly by means of the cap, for any difference in expansion is compensated for by the spring of such pipes as are so transversely or spirally arranged.

I have spoken of groups of pipes, meaning of course to convey the idea that the central pipe might consist of two parts and is to be thought of in any event as a group in contrast with the other pipes which make up another group, one group leading the gases outwardly and the other leading them back. In the form in which I have arranged it, the central large pipe is the outleading pipe or group and the small pipes constitute the return group.

Among other advantages of such spiral or transverse arrangement of some portions of the pipe in the superheater unit is the possibility of reducing the length of such units because of the increased heating effect of the passing gases.

By making the two headers U-shaped and placing them in proximity to each other about the outer portion of the boiler the superheater flues and units can be arranged in a group or groups about the central boiler flues, and in order that each superheater unit may be a duplicate of all others so that they are interchangeable it is only necessary to arrange these headers so that the distances from the ends of the superheater units when in position to the headers will in all cases be the same. In such a superheater arrangement the superheater flues are preferably of considerable diameter compared with the ordinary boiler flues and in order to make these distances uniform and at the same time arrange the flues as compact as possible I prefer to arrange the superheater flues in staggered relation and then carry out between each pair of flues when desired a projection from the headers so that these distances will always be the same.

Another reason for arranging the superheater flues in vertical lines or groups on opposite sides of the boiler is to get as many as possible of them from behind the smoke stack extension.

I claim:

1. The combination with a boiler flue and saturated and superheated steam headers of a superheater element comprising a pipe centrally arranged within the flue and in communication at one end with one of said headers, a series of smaller pipes surrounding such central pipe in communication at one end with the other of said headers, and a connection between the free ends of all said pipes, the connection between the free ends of the pipes comprising a cap having a hollow connecting chamber, the end of each pipe discharging thereinto and rigidly attached thereto, said cap being open on its end away from the pipe, a conical cover mounted in and closing said open end, the apex of such cover being pointed toward the boiler fire-box.

2. The combination with a boiler flue and saturated and superheated steam headers of a superheater element comprising a pipe centrally arranged within the flue and in communication at one end with one of said headers, a series of smaller pipes surrounding such central pipe in communication at one end with the other of said headers, and a connection between the free ends of all said pipes, means rigidly mounted on the central pipe for spacing the other pipes in permanent relation with respect one to another and to the central pipe, said holding means comprising a pair of pipe engaging saddles, flanges projecting therefrom, and means for clamping said saddles in position on the central pipe, and for clamping the other pipes in position against such flanges.

3. The combination with a boiler flue and saturated and superheated steam headers of a superheater element comprising a central pipe attached at one end to one of said headers, a series of pipes wound spirally about the central pipe and attached at one end to the other of said headers, and a single connection between the free ends of all said pipes, means rigidly mounted on the central pipe for spacing the other pipes in permanent relation with respect one to another and to the central pipe, said holding means comprising a pair of pipe engaging saddles, flanges projecting therefrom, and means for clamping said saddles in position on the central pipe, and for clamping the other pipes in position against such flanges.

4. The combination with a series of pipes comprising one central and a plurality of smaller surrounding pipes of means for holding them in position comprising a two part split ring adapted to closely engage the central pipe, and a series of flanges projecting therefrom, means for locking the parts of the ring together and for clamping the surrounding pipes into engagement with said flanges.

5. The combination with a saturated and a superheated steam header of a superheater element comprising a central pipe terminating in one of said headers and a series of return pipes terminating in the other header, the return pipes being spread apart in two pairs, one on either side of the central pipe immediately adjacent their point of connection with their header.

6. The combination with a saturated and superheated steam header each having apertures therein, of a series of plugs arranged in pairs, one in an aperture in each header and a single crab having its ends resting upon said plugs, and means for clamping said crab against said plugs for holding them in position, one of said plugs having a single central aperture, the other a series of separate apertures, one end of the crab being bifurcated to engage the plug on opposed sides of the single aperture, the other end of the crab engaging the plug intermediate said aperture.

7. The combination with a superheater header and locomotive smoke box of a fixed track on either side of the smoke box, and a member projecting from the header and resting in slidable engagement on such track, a pair of brackets mounted on the smoke box wall adapted to support the free end of such track and hold it rigidly in position, said track comprising hollow tubing, a track extension bar adapted to penetrate such hollow tubing to support the header when it is removed from its working position.

8. The combination with a locomotive boiler of a superheater header having a central portion extending across the front of the boiler toward the top and side arms extending down along the side of the boiler on either side of the smoke box, an anchoring connection between the lower end of the header arm and the head of the smoke box, and a frictional supporting connection between the header arms intermediate their ends and the boiler, said connection consisting of a rod slidably mounted on bearing brackets.

9. In a superheater, a saturated and superheated steam header arranged adjacent one to the other, superheater elements interposed between them, means for supplying saturated steam to the center of saturated steam header, and for withdrawing superheated steam from the center of the other, the centers of said headers being substantially co-incident, said headers being of substantially horse shoe shape and decreasing in cross-sectional area from the center outwardly.

10. In a superheater a saturated and a superheated steam header arranged side by side, a single thin metallic web connecting them, a series of spacing members interposed between them at widely distributed points, the walls of said headers being apertured, superheater elements in register with said apertured walls, separate pockets interposed between said headers, and means controlled by bolts for holding said elements in position, said bolts engaging said pockets.

11. In a superheater element, the combination with a central pipe of a hollow cap inclosing the open end thereof, a series of return pipes grouped about the hollow pipe, and in communication with the cap, the cap having a series of curved extensions grouped about that part of it which engages the central pipe to furnish a connection for the other pipes.

12. In a superheater element, the combination with a central pipe of a hollow cap inclosing the open end thereof, a series of return pipes grouped about the hollow pipe, and in communication with the cap, the cap having a series of curved extensions grouped about that part of it which engages the central pipe to furnish a connection for the other pipes, and a series of tapered guide vanes projecting outwardly from such extensions to engage the flue wall.

13. The combination with a locomotive superheater header and locomotive smoke box of a supporting track mounted in the smoke box and in slidable engagement with the header, a flanged portion of the header bearing directly on it, and means independent of said track for holding the header in position thereon, consisting of straps uniting the header with the wall of the smoke box.

14. A superheater element for steam boilers comprising a pipe system adapted to be placed inside of the flue and a cap on the end of such pipe system having a hollow conical point communicating with the pipe system extending toward the onflowing heated gases, and adapted to be filled with steam, said cap being rigidly connected with all the pipes of such system.

15. The combination of a header element for a steam boiler superheater system comprising two U-shaped portions, one behind the other and having apertures on the surfaces facing the hollow formed by the arms of the U with superheater units whose members are adapted to be secured to said portions at such apertures.

16. The combination of a header element for a steam boiler superheater system comprising two U-shaped portions, one behind the other and having apertures on the surfaces facing the hollow formed by the arms of the U with superheater units whose members are adapted to be secured to said portions at such apertures, said apertures placed one behind the other.

17. The combination of a header element for a steam boiler superheater system comprising two separately spaced U-shaped portions, one behind the other and having projections and apertures on the surfaces facing the hollow formed by the arms of the U with superheater units whose members are adapted to be secured to said portions at such apertures, said apertures inclined to the axial line of the superheater element, said apertures arranged on the projections and on the body of the superheater portions.

In testimony whereof I affix my signature in the presence of two witnesses this 29th day of April, 1916.

CHARLES W. DAKE.

Witnesses:
GENEVA HUTH,
MINNIE M. LINDENAU.